US010462748B2

(12) United States Patent
Da Costa et al.

(10) Patent No.: US 10,462,748 B2
(45) Date of Patent: Oct. 29, 2019

(54) ENERGY SAVINGS MODE FOR SILENT HAPTICS

(71) Applicant: Immersion Corporation, San Jose, CA (US)

(72) Inventors: Henry Da Costa, Montreal (CA); Yoshiaki Date, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/079,991

(22) Filed: Mar. 24, 2016

(65) Prior Publication Data
US 2017/0280397 A1    Sep. 28, 2017

(51) Int. Cl.
| H04M 3/00 | (2006.01) |
| H04W 52/02 | (2009.01) |
| G06F 1/3287 | (2019.01) |
| G08B 6/00 | (2006.01) |
| G06F 3/01 | (2006.01) |
| G06F 1/16 | (2006.01) |
| G06F 1/3215 | (2019.01) |
| G06F 1/3231 | (2019.01) |
| H04M 19/04 | (2006.01) |

(52) U.S. Cl.
CPC ........ *H04W 52/0267* (2013.01); *G06F 1/163* (2013.01); *G06F 1/3215* (2013.01); *G06F 1/3231* (2013.01); *G06F 1/3287* (2013.01); *G06F 3/016* (2013.01); *G08B 6/00* (2013.01); *H04W 52/0229* (2013.01); *G06F 2203/014* (2013.01); *H04M 19/047* (2013.01); *Y02D 10/173* (2018.01); *Y02D 70/26* (2018.01)

(58) Field of Classification Search
None
See application file for complete search history.

(56) References Cited

U.S. PATENT DOCUMENTS

| 6,732,357 B1 * | 5/2004 | Berry ................. G06F 11/3636 717/158 |
| 2007/0091063 A1 * | 4/2007 | Nakamura .............. G06F 3/016 345/156 |

(Continued)

FOREIGN PATENT DOCUMENTS

| EP | 2 846 330 | 3/2015 |
| EP | 2 937 863 | 10/2015 |

OTHER PUBLICATIONS

European Search Report issued in EP application No. 16192799.1, dated Aug. 3, 2017.

*Primary Examiner* — Jinsong Hu
*Assistant Examiner* — Alexander J Yi
(74) *Attorney, Agent, or Firm* — Medler Ferro Woodhouse & Mills PLLC

(57) ABSTRACT

A method and system for energy savings with silent haptics is presented. A haptically-enabled device includes a processor that executes a haptic track containing haptic instructions. The haptic track is analyzed to determine the presence of a zero-force interval, also known as a silent haptic. The duration of the zero-force interval is determined, and if the duration exceeds a pre-determined threshold, then the system or method enters an energy savings mode. An overhead time associated with the terminating of the energy savings mode is determined. And, the energy savings mode is terminated at the conclusion of the zero-force interval less the overhead time.

19 Claims, 10 Drawing Sheets

(56) References Cited

U.S. PATENT DOCUMENTS

| | | | |
|---|---|---|---|
| 2012/0062482 A1* | 3/2012 | Ding | G06F 1/3215 345/173 |
| 2014/0192247 A1* | 7/2014 | Cheong et al. | H04N 5/23293 348/333.11 |
| 2015/0241972 A1 | 8/2015 | Lacroix | |

* cited by examiner

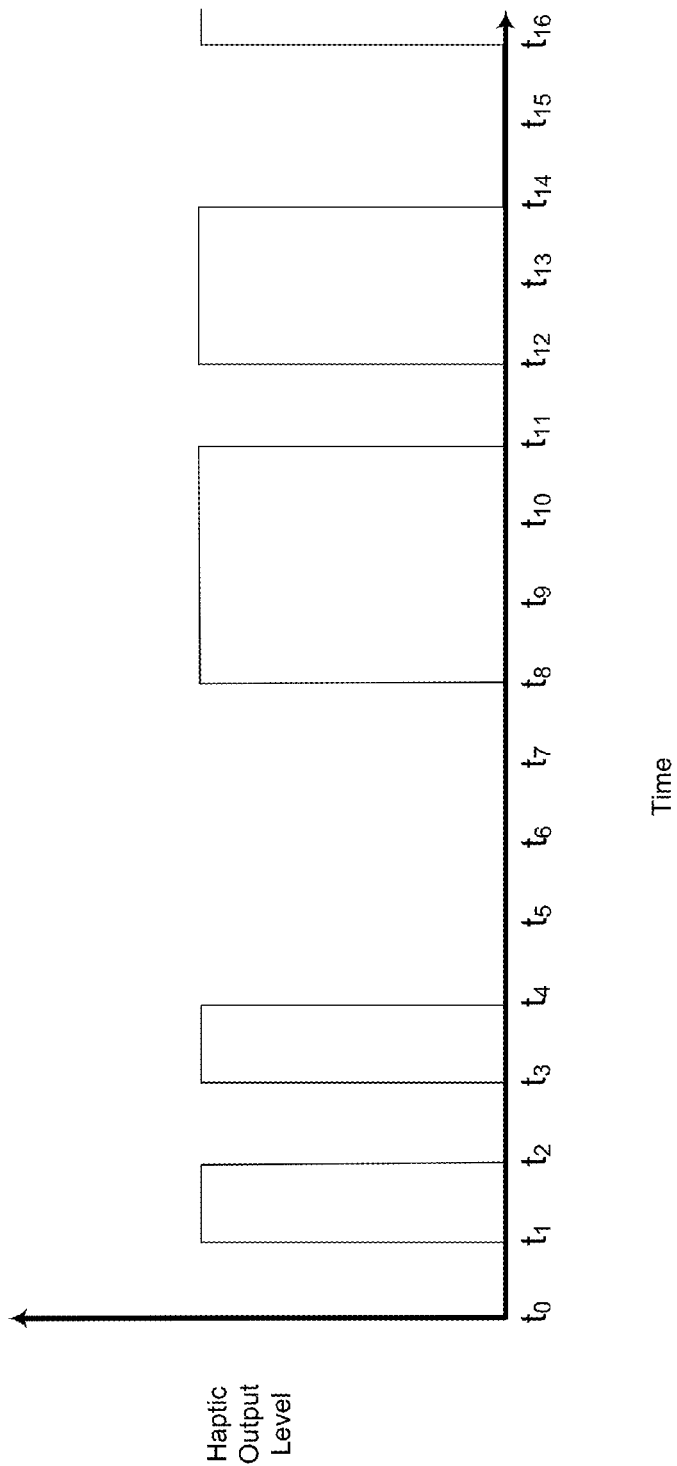

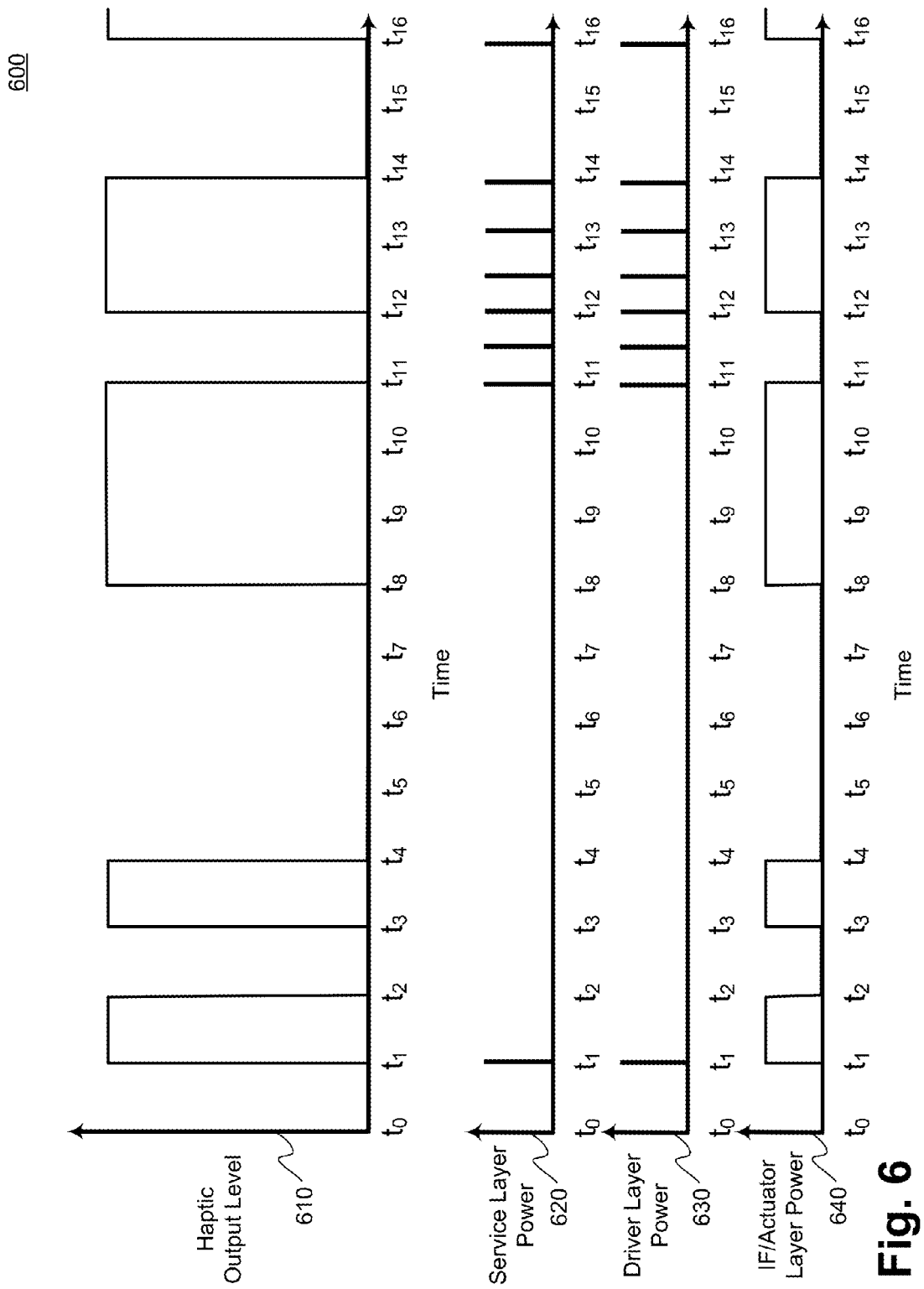

ENERGY SAVINGS MODE FOR SILENT HAPTICS

FIELD

One embodiment is directed generally to haptic effects. More particularly, an embodiment is directed to energy savings and haptic effects.

BACKGROUND INFORMATION

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect that is perceived by the user.

Devices that generate haptic effects typically rely on batteries as their source of power. Battery life has always been an issue, however as devices become more sophisticated, power consumption becomes even more of a design issue. Therefore, methods to reduce power consumption are a critical portion of product design.

Many different haptically-enabled devices exist that include a haptic system for the generation of haptic effects. For many of these devices, especially non-mobile devices, the power consumption needed to generate haptic effects is largely irrelevant. However, power consumption, and battery life, is always a key concern in mobile devices. Longer life between charges is seen as very valuable by consumers. Even with mobile devices such as smartphones, where minimizing the power consumption associated with mobile device applications is a constant concern, the power consumption from haptic effects in relatively small. Studies have shown that under worst-case usage scenarios for a 24-hour period, typical haptic effects consume from 0.95 to 4.11 percent of the device battery capacity, depending on the use case.

However, wearable devices generally have an increased need to reduce power consumption. Most wearable devices are expected to last many days or weeks between charges, as opposed to some smartphones that are expected to be charged nightly. As a consequence, wearable devices have a tight energy budget for generating haptic effects in view of a typically (e.g., ~250 mAh) battery that is expected to work for up to 7 days between charges. Relative to smartphones, the haptic effects on a wearable device can potentially consume a large percentage of the power budget.

SUMMARY

One embodiment includes the use of a haptically-enabled device that includes a processor that executes a haptic track. The haptic track is analyzed to determine the presence of a zero-force interval (i.e., silent haptics). The duration of the zero-force interval is determined, and if the duration exceeds a pre-determined threshold, then the system enters an energy savings mode. An overhead time associated with the terminating of the energy savings mode is determined. The energy savings mode is then terminated at the conclusion of the zero-force interval less the overhead time.

BRIEF DESCRIPTION OF THE DRAWINGS

FIGS. 2A and 2B illustrate a haptic track that includes silent, zero-force haptic intervals, according to an embodiment.

FIG. 6 illustrates power consumption with an energy savings mode and pattern generation, by control layer, of a haptically-enabled system, according to an embodiment.

DETAILED DESCRIPTION

Haptically-enabled devices produce a variety of haptic effects that are typically controlled by a haptic track (e.g., a thread of haptic instructions). The haptic track includes various instructions that specify the attributes of each haptic effect, such as intensity, duration and frequency. Haptic effects are typically synchronized with some other stream of information such as a video, audio or a game. The haptic track also includes periods of "zero-force" intervals, or silent haptics, where the haptically-enabled device produces no haptic effects. Further, these zero-force intervals usually occur between two effects and are very common in periodic effects.

One embodiment is a haptically-enabled system that enters an energy savings mode when a silent haptic effect is detected. The system scans the haptic track to determine the presence of a silent haptic instruction, also known as a zero-force interval. The system then determines the duration of the zero-force interval. Before a decision is made to enter an energy savings mode the system determines if the duration of the zero-force interval exceeds a pre-determined threshold. If the interval is less than the threshold, it typically is an indication that the time and energy to initiate entry into an energy savings mode is not economical. If the duration of the interval exceeds the threshold, then entry into the energy savings mode is initiated. Entry into the energy savings mode is initiated at the start of the zero-force interval. The system then determines the overhead time associated with the termination of the energy savings mode and terminates the energy savings mode at the conclusion of the zero-force interval less the overhead time.

In another embodiment, rather than continuing existing in the energy savings mode until the conclusion of the zero-force interval less the overhead time, the system, upon receipt of a haptics call, will prematurely terminate the energy savings mode. In the case of early termination, the system determines the duration that it was in the energy savings mode so that the system can synchronize itself with the execution of the haptic track.

In another embodiment, to achieve higher energy savings and efficiencies, the system analyzes the haptic track for future occurrences of zero-force intervals. Rather than terminating the energy savings mode at the completion of a first zero-force interval the system will stay suspended as it has already identified a "pattern" of haptic effects that includes additional zero-force intervals and intervening haptic instructions and will thus stay in the energy savings mode until execution of the pattern is completed. Upon completion of the pattern less the overhead time, the system will terminate the energy savings mode.

Figure 1:
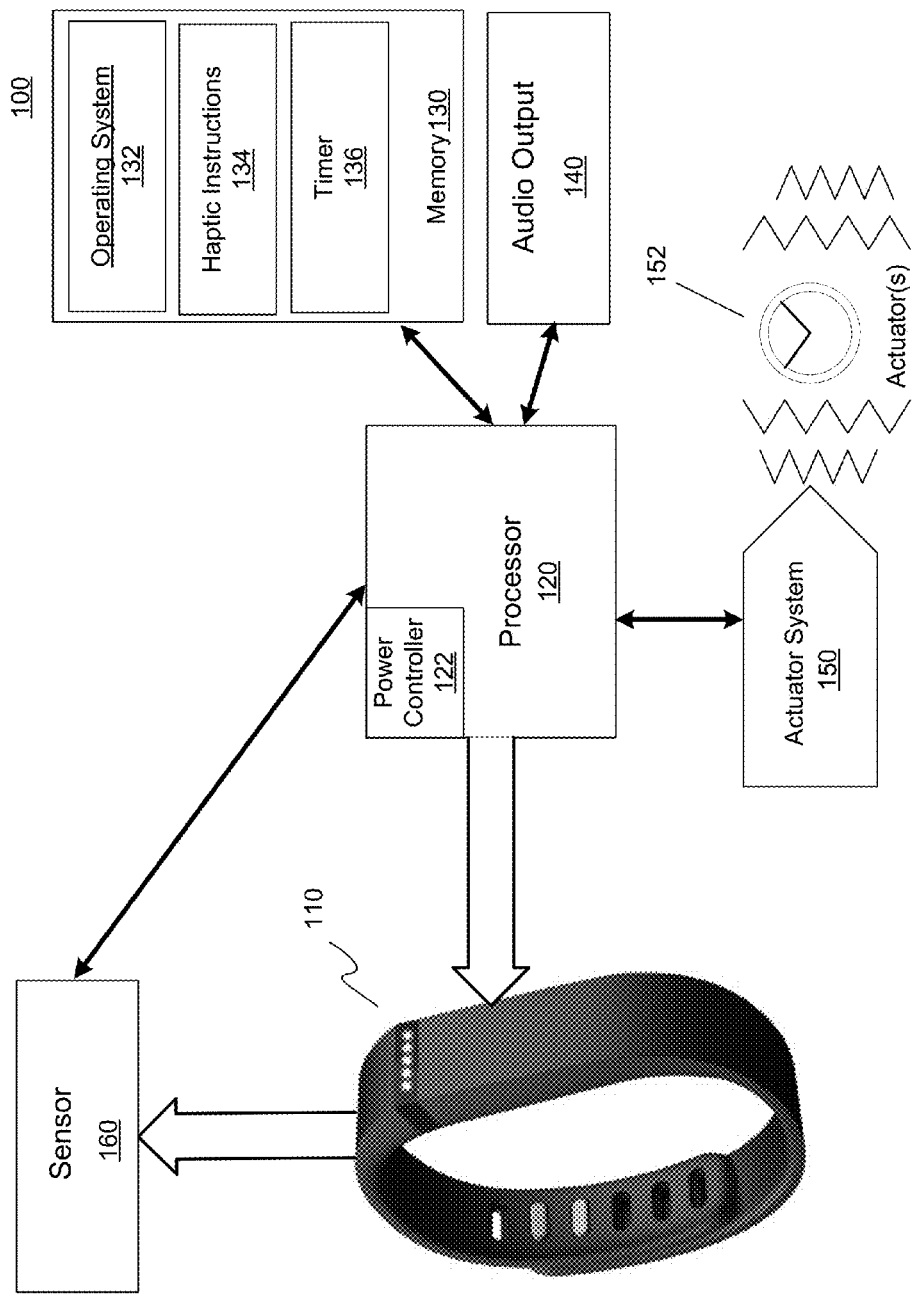
FIG. 1 is a diagram of a haptically-enabled system in accordance with an embodiment of the present invention.

FIG. 1 is a block diagram of a haptic system 100 in accordance with an embodiment of the present invention. System 100 includes a haptic device 110. Haptic device 110 also includes a processor 120 with a power controller 122, an actuator system 150 including actuator 152, a memory 130 that contains an operating system 132, haptic instructions 134, and a timer 136. System 100 also includes an audio output 140 and a sensor 160.

Haptic device 110 can also include a display screen (not shown) that can be touch sensitive. Therefore, in addition to displaying images, the screen is capable of recognizing touches, such as those provided by a user, and may also recognize any of the position, pressure magnitude, and duration of touches on the surface. The data corresponding to the touches is sent to processor 120, or another processor within system 100, and processor 120 interprets the touches and in response generates haptic effect signals. The touch surface may sense touches using any sensing technology, including capacitive sensing, resistive sensing, surface acoustic wave sensing, pressure sensing, optical sensing, etc. The touch surface may sense multi-touch contacts and may be capable of distinguishing multiple touches and the location of the touches that occur at the same time.

Haptic device 110 may contain other components that are not shown including, for example, a power source, I/O ports, microphone, control buttons, camera, etc. Further, haptic device 110 may also contain an RF transmitter/receiver and processor 120 can also generate haptic effects in response to signals received via the RF transmitter/receiver.

Haptic device 110 includes processor 120 that is coupled to memory 130. Memory 130 may contain various components for retrieving, presenting, modifying, and storing data. For example, memory 130 may store software modules that provide functionality when executed by processor 120. Memory 130 can store an operating system in addition to haptic effects instructions. Haptic instructions are also referred to as a "haptic track" and provide a stream of commands to processor 120 that control actuator system 150 to produce the desired haptic effects. These commands include the type of effect (e.g., vibration, deformation, shaking, etc.), and other parameters such as frequency, duration, strength, on/off, pervasiveness, themes, preferred haptic actuator, and preferred information encoding. Actuator system 150 is coupled to one or more actuators 152. Processor 120 can receive data, instructions, video and/or audio content. Videos, games and haptically-enabled applications typically include a set of configuration settings that initialize the above referenced parameters. Non-transitory memory 130 may include a variety of computer-readable medium that may be accessed by processor 120. In the various embodiments, memory 130 may include volatile and nonvolatile medium, removable and non-removable medium. For example, memory 130 may include any combination of random access memory ("RAM"), dynamic RAM (DRAM), static RAM (SRAM), read only memory ("ROM"), flash memory, cache memory, and/or any other type of non-transitory computer-readable medium.

Processor 120 can decide what haptic effects are to be played and the order in which the effects are played based on configuration setting parameters. A haptic effect may be considered "dynamic" if it includes some variation of these parameters when the haptic effect is generated or a variation of these parameters based on a user's interaction. A certain defined sequence of haptic effects can also be referred to as a "pattern" where a particular pattern includes a specific sequence of haptic instructions and zero-force intervals.

Actuators 152 can include one or multiple actuators where such actuators include deformation and vibration type actuators, or where a deformation actuator could be used to deform and to vibrate. The actuators can include any type of motor, including without limitation, an Eccentric Rotating Mass ("ERM"), a Linear Resonant Actuator vibration motor ("LRA"), a piezoelectric motor, or a solenoid actuator. In addition to or in place of actuator 152, system 100 may include other types of haptic output devices (not shown) that may be non-mechanical or vibrotactile haptics devices such as devices that generate electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, devices that provide electrical muscle stimulation, etc. Further, actuators 152 can utilize shape memory alloy ("SMA") wires to force haptic device 110 to bend along one or more axes (e.g., along the corners or to twist). Other technologies such as smart materials, strings pulled by motors, or arrays of moveable pins could also be used for actuation.

Actuator system 150 with actuators 152 produces haptic effects that include various vibrations and shaking effects. Actuator system 150 and actuators 152 can also be used to deform the shape of haptic device 110. Such deformation can occur in a single axis, two axes, or in three axes and can produce an extension, twisting or bending of haptic device 110 in one, two, or three dimensions.

Processor 120 may be any type of general purpose processor, or could be a special purpose processor specifically designed to provide haptic effects, such as an application-specific integrated circuit ("ASIC"). Processor 120 may be the same processor that operates the entire system 100, or may be a separate processor. Processor 120 fetches haptic effects instructions from memory 130 that direct processor 120 as to which particular haptic effects are to be produced by actuator driver 150, including the characteristics of the effects. Haptic effects instructions can be pre-loaded and resident in memory, or they can be loaded from an integrated port, (e.g., a Universal Serial Bus ("USB")), or downloaded via a data stream.

Processor 120 outputs the command and control signals to actuator system 150, which includes electronic components and circuitry used to supply actuator 152 with the required electrical current and voltage (e.g., "motor signals") to cause the desired haptic effects. As previously mentioned, system 100 may include more than one actuator 152, and each actuator may include a separate drive circuit (not shown), all coupled to processor 120.

System 100 may include a variety of sensors, such as sensor 160, for sensing interactions with haptic device 110. Sensor 160 can include, among others: strain gauge sensors to measure the deformation magnitude during interactions, force sensing resistor ("FSR") sensors to measure the force/stress applied to the haptic device, multi-touch touch sensors to detect the location of single or multiple touch inputs in a touch-enabled display, multi-touch pressure sensors to measure the pressure applied under each touch location, temperature/humidity/atmospheric pressure sensors to capture environmental conditions. The sensors can also include an accelerometer/gyroscope/magnetometer to characterize the motion, velocity, acceleration and orientation of the display, a microphone to capture a user's voice command or environmental audio information including sounds from haptic effects occurring naturally or by haptic-enabled devices, and wireless transmitters to receive/transmit information from/to other devices wirelessly. The data corresponding to sensor 160 is sent to processor 120, or another processor within system 100, and processor 120 interprets the sensor data and in response can generate haptic effect signals, generate or modify haptic configuration settings, produce feedback, audio responses, and visual images.

System 100 may be a handheld device, such a cellular telephone, personal digital assistant ("PDA"), smartphone, computer tablet, gaming console, vehicle based interface, etc., or may be any other type of device that includes a haptic effect system with one or more actuators. The user interface may be a touch sensitive surface, or can be any other type of user interface such as a microphone, camera, etc. In embodiments with more than one actuator, each actuator that has rotational capability may have a different rotational capability in order to create a wide range of haptic effects on the device, for example each actuator can be controlled individually; also some rotational actuators have their axis of rotation at an angle to the axis of rotation of other rotational actuators. Likewise, in embodiments with multiple actuators with other capabilities, each actuator can be controlled individually to exhibit a wide range of haptic effects on the device.

FIG. 2A is an illustration of a possible haptic track 200, a sequence of haptic instructions, according to an embodiment. The vertical axis illustrates a haptic output level while the horizontal axis represents time. Haptic track 200 includes times of active haptic effects, such as starting at time $t_1$ and ending at time $t_2$. Haptic track 200 also includes times of zero-force haptic intervals in which there are no haptic effects being generated, such as between $t_0$ and $t_1$.

The haptic output levels shown in FIG. 2A do not represent actual haptic output levels, but rather illustrate that there is some amount of "non-zero" activity. Further, the non-zero haptic output times can be produced by processor 120 executing one or multiple haptic instructions 134.

In an embodiment, processor 120, in conjunction with timer 136, outputs an output force level on a periodic basis. As an example, each time period could represent 5 milliseconds ("ms"). At each 5 ms period, timer 136 produces an interrupt that signals processor 120 to process a haptic computation that defines the type of haptic effect that is to be generated for the next 5 ms. As such, at $t_0$ processor 120 calculates the haptic effect to be generated for the 5 ms period from $t_0$ to $t_1$. In this example, the desired haptic effect is a silent haptic consisting of a zero-force silent haptic command. Once the command is issued, processor 120 waits for the next interrupt. Then, at $t_1$ the processor receives another interrupt and calculates the haptic effect for the next period. In this example, from $t_1$ to $t_2$ there is a non-zero haptic output and thus processor 120 would generate the appropriate haptic effects command, or multiple commands for the time period.

This process continues for each interrupt received by processor 120 from timer 136. Note that between $t_4$ and $t_8$ there is a long period of zero-force output. However, processor 120 still receives an interrupt from timer 136 every 5 ms and therefore must process the interrupt that generates a silent haptic instruction for each time period. The processing of interrupts consumes power not just for the actual production of the haptic effects by actuator system 150, but also for processor 120, driven by timer 136, to be interrupted every 5 ms to process what action is to be taken, including the $t_4$-$t_8$ zero-force interval.

One embodiment of the invention enables the processor to become idle during the zero-force intervals and not have to compute zero-force haptic commands every 5 ms. The identification of such an idle period would allow the processor to enter an energy savings mode during the zero-force interval. For example, processor 120 could identify a 100 ms zero-force interval and enter an energy savings mode during that time. During the zero-force interval, timer 136 would be reset to generate an interrupt only at the end of the 100 ms zero-force interval, and not the previous 5 ms intervals. However, timer 136 is not the only source of interrupts. Another source could be a software application or some type of user input that could generate an interrupt requesting the processor generate a series of haptic commands. If this additional interrupt occurs during this 100 ms energy savings mode then there are two options to respond. First, the interrupt could be ignored and not processed until the current energy savings mode expires. The second option could be to prematurely terminate the energy savings mode and service the interrupt.

There are pros and cons to each of these options. If servicing of the interrupt is delayed until the end of the zero-force interval, in the example the 100 ms, then the energy savings are maintained but servicing the interrupt is delayed. Delaying servicing of the interrupt could result in lag times that may be unacceptable to the user. If the energy savings period is prematurely interrupted then energy savings are diminished, but the interrupt is timely serviced. Further, if the energy savings mode is prematurely terminated then the processor has to re-synchronize itself as it is now processing commands sooner than was planned.

Figure 2B:
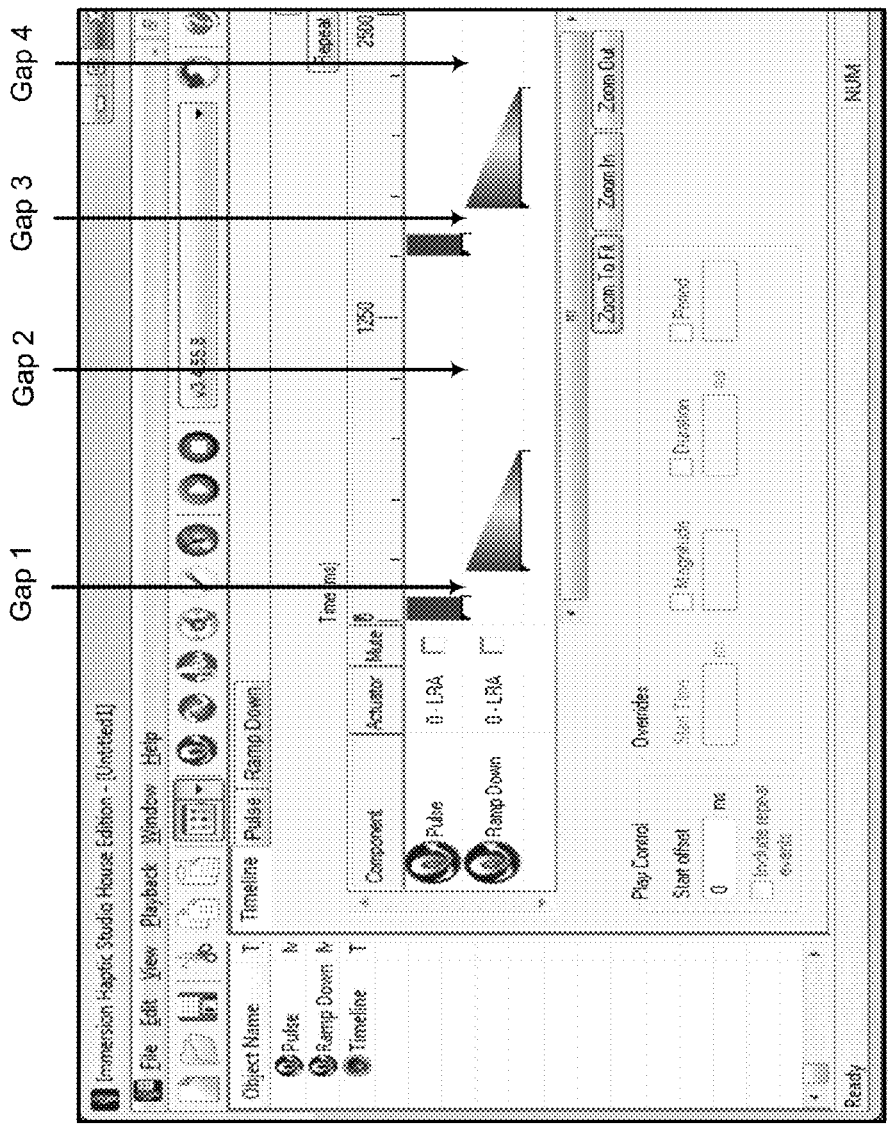

FIG. 2B depicts a screen shot of a possible haptic track, a sequence of haptic instructions, according to an embodiment. FIG. 2B highlights two types of haptic effects, a pulse and a ramp down, in a stream of haptic effects with zero-force gap intervals between the haptic effects. The gaps are labeled a gap 1, gap 2, gap 3 and gap 4.

Figure 3:
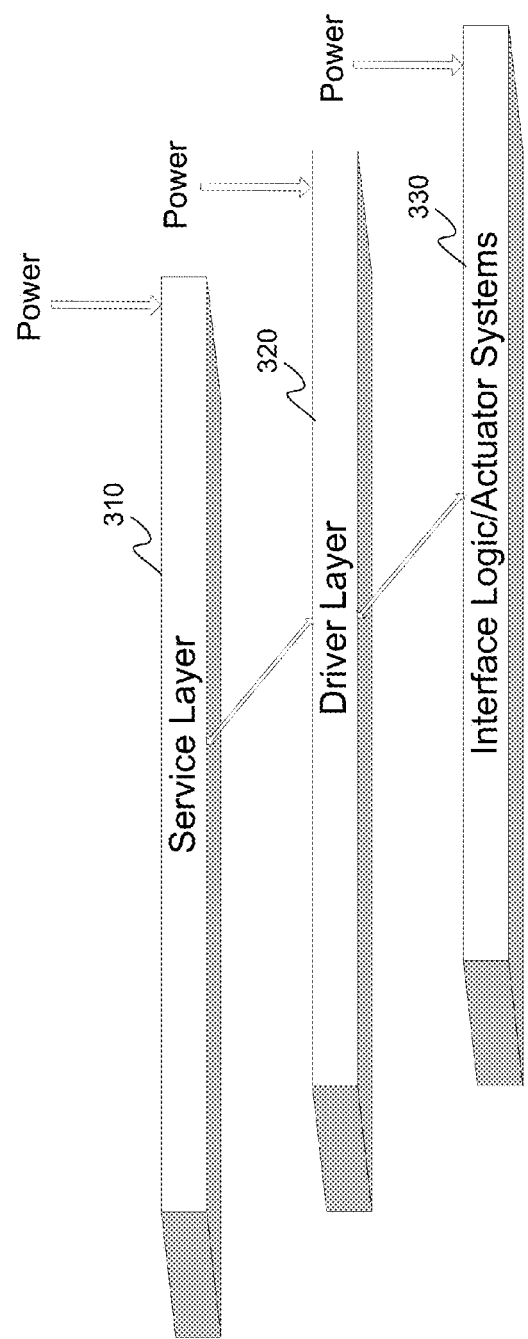
FIG. 3 illustrates multiple control layers of a haptically-enabled system, according to an embodiment.

FIG. 3 illustrates the control layers associated with the implementation of an energy savings mode in a haptically-enabled system 300, according to an embodiment. The software, algorithms, controllers and circuitry that control a haptically-enabled device can be viewed in terms of layers of functionality. The lowest level, interface logic and actuator systems layer 330 controls the hardware actuators and controllers that produce the desired haptic effects (e.g., actuator system 150 and actuators 152 of FIG. 1). During a zero-force interval, interface logic/actuator systems layer 330 could be shut down to conserve energy.

Driver layer 320 is typically a software implementation and is responsible for sending instructions to the actuator systems in layer 330. In one embodiment, driver layer 320 is responsible for determining upcoming zero-force intervals. Driver layer 320 would also control timer 136 settings, including the periodic timing interrupts discussed in conjunction with FIG. 2A, and therefore determines and controls the duration of an energy savings period. Driver layer 320, in processing instructions, does consume a portion of processing power and therefore during an energy savings period would enter an energy savings period between servicing timer 136 interrupts, as discussed in greater detail in conjunction with FIGS. 4, 5 and 6.

Service layer 310 is the highest level and is always active. Service layer 310 can also include a haptic rendering thread that can be subject to the energy savings mode. Service layer 310 oversees and controls all the functionality of the haptic systems in a haptically-enabled device. Service layer 310 issues calls to driver layer 320 pertaining to the desired haptic effects to be processed. In an alternate embodiment, service layer 310 is responsible for the determination and calculation of the duration of the zero-force intervals.

Figure 4:
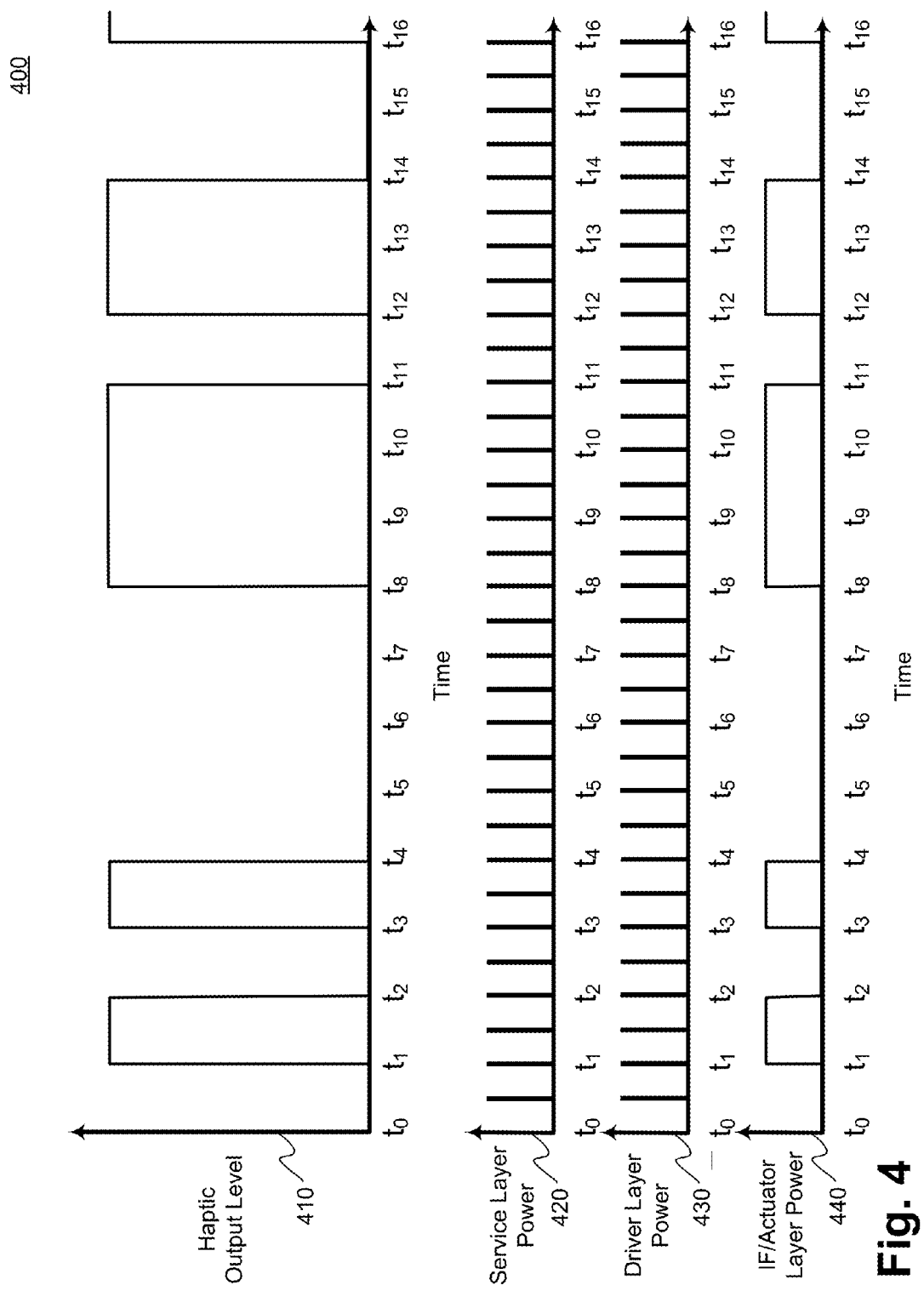
FIG. 4 illustrates power consumption, by control layer, of a haptically-enabled system, according to an embodiment.

FIG. 4 illustrates power consumption associated with the control layers in a haptic system 400, according to an embodiment. The haptic output level graph 410 is a duplicate of FIG. 2A that shows haptic effects occurring between $t_1$ and $t_2$, $t_3$ and $t_4$, $t_8$ and $t_{11}$, $t_{12}$ and $t_{14}$ and also starting at $t_{16}$. The haptic output level graph also shows zero-force intervals between $t_0$ and $t_1$, $t_2$ and $t_3$, $t_4$ and $t_8$, $t_{11}$ and $t_{12}$, and $t_{14}$ through $t_{16}$.

Driver layer power graph 430 indicates a periodic power draw. As discussed relative to FIGS. 2 and 3, timer 136 generates periodic interrupts in which driver layer 320 computes haptic content commands to send to interface logic and actuator systems layer 330. In the previous example, timer 136 generated an interrupt every 5 ms. Applying that example to FIG. 4, the time periods can be defined, e.g., $t_0$ to $t_1$, to be 10 ms. Thus, driver layer 330 indicates a power draw every 5 ms, when timer 136 produces an interrupt and driver layer 330 powers up and determines what haptic effects are to be generated by IF/Actuator Systems layer 330. After driver layer 330 sends commands to IF/Actuator Systems layer 330, it powers down until the next interrupt.

As previously discussed, service layer 310 is always active, but only consumes power when an application requests playing a new effect, and periodically, such as every 5 ms, when it is interrupted by timer 136 to compute and send a new force value to driver layer 320. Therefore, service layer power graph 420 indicates a level of power consumption similar to that of power graph 430. All of the power levels shown in FIG. 4 are not shown to indicate specific levels, but rather to indicate the relative consumption of power or no consumption of power.

IF/Actuator Layer Power graph 440 shows the power consumption associated with Interface Logic and Actuator Systems layer 330. Note that power consumption parallels the haptic output levels shown in graph 410.

Figure 5A:
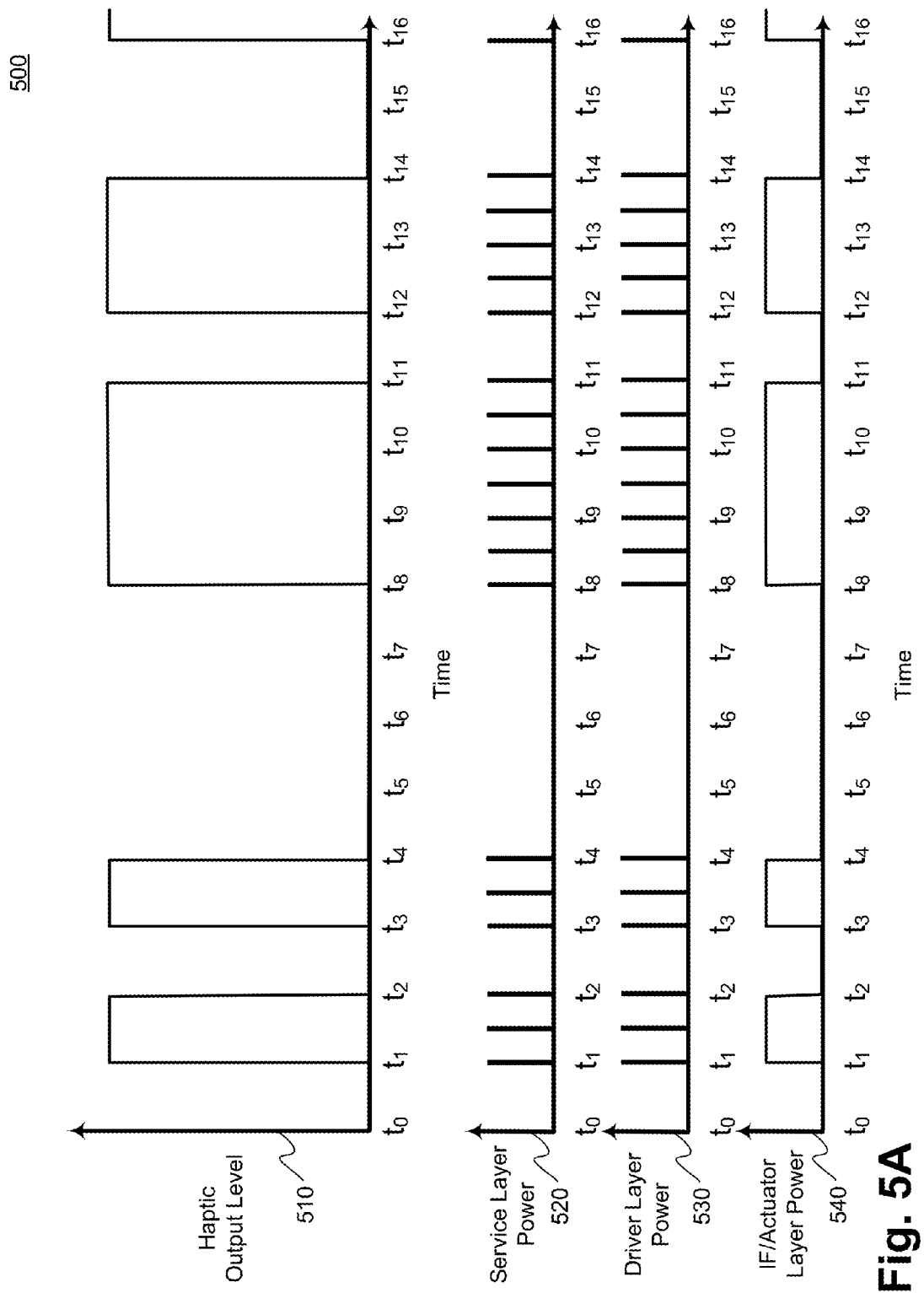
FIGS. 5A, 5B and 5C illustrate multiple configurations of power consumption with an energy savings mode, by control layer, of a haptically-enabled system, according to an embodiment.

FIG. 5A illustrates power consumption associated with the control layers in a haptic system 500, including implementation of an energy savings mode, according to an embodiment. System 500 is similar to system 400, except for service and driver layer power graphs 520 and 530. Driver Layer Power graph 530 indicates a power draw only during a non-zero haptic effect. Thus, Driver Layer Power graph 530 indicates no power draw during zero-force intervals. Now, Driver Layer Power 530 is only active at periodic intervals during a non-zero haptic effect. These periodic interrupts are necessary to calculate the force values needed while playing a non-zero haptic effect. Thus, for the same time periods shown in FIGS. 4 and 5A, FIG. 4 shows 32 instances of power consumption versus 19 in FIG. 5A.

Figure 5B:
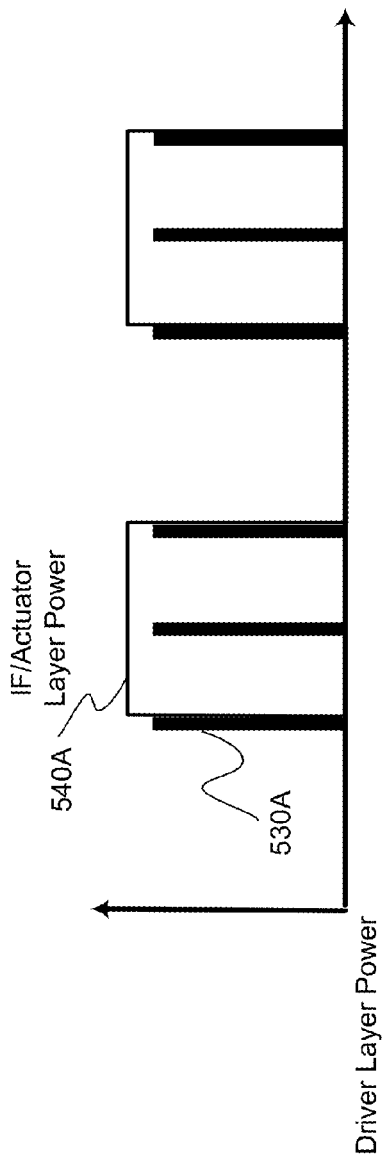

FIG. 5B illustrates an enlargement of FIG. 5A for periods $t_0$ through $t_4$ according to an embodiment. Element 530A indicates Driver Layer Power and element 540A indicates IF/Actuator Power. Note that Driver Layer Power 530A intervals precede IF/Actuator Layer Power intervals. When processor 120 is "asleep" or in an energy savings mode there is some amount of time needed (i.e., overhead) to "wake" the processor and to restore resources to their previous state. Therefore, timer 136 would be programmed to generate an interrupt at the termination time of the zero-force interval, less the overhead time required to wake the processor, and any other necessary components, and restore resources to their previous state. Hence, FIG. 5B illustrates this overhead time needed to accurately generate the desired haptic output.

Figure 5C:
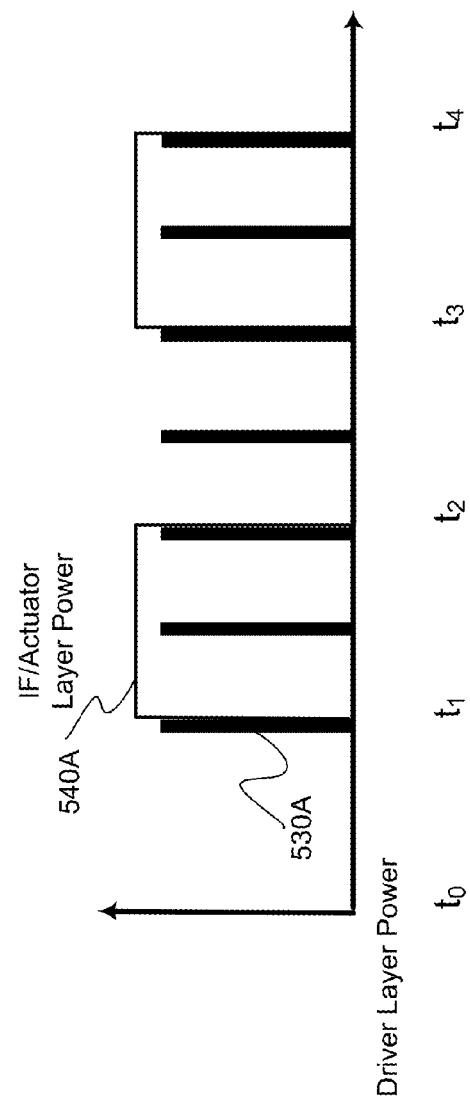

In addition to the overhead time associated to enter and exit an energy savings mode, there is also a certain amount of energy needed to prepare a system for an energy savings mode, such as register storage. FIG. 5C illustrates power consumption for a portion of a haptic track when entering an energy savings mode is determined not to be efficient, according to an embodiment. FIG. 5C, for periods $t_1$ through $t_4$ shows two periods of haptic activity and one period of silent haptics. Depending upon the energy needed to put resources into an energy savings mode and restore them, this duration of a zero-force interval may not be sufficient to enter an energy savings mode. Thus, processor 120, after determining the duration of the zero-force interval, determines that the duration does not exceed a threshold duration amount and therefore does not enter the energy savings mode. Thus, as in the previous example, timer 136 generates interrupts every 5 ms during a non-zero force haptic effect and also in the intervening zero-force interval through to period $t_4$. At $t_4$, according to FIG. 5A, there is a zero-force interval of 4 periods, which for example, processor 120 determines is greater than the threshold duration level and initiates an energy savings mode at $t_4$, less the overhead time discussed above.

FIG. 6 illustrates power consumption associated with the control layers in a haptic system 600, including implementation of an energy savings mode using patterns, according to an embodiment. Rather than evaluating whether to initiate an energy savings mode based on one upcoming zero-force intervals, FIG. 6 illustrates the concept of patterns. For example, if a certain haptic sequence is used multiple times, a pattern is defined for that particular sequence. Then, service and driver layers 310 and 320 can initiate the pattern and enter the energy savings mode for the duration of the pattern, less the overhead time to restore the resources.

For example, a haptic pattern can defined by the following sequence:

| | |
|---|---|
| Initial State | On |
| After 1 period | Off |
| After 2 periods | On |
| After 3 periods | Off |
| After 4 periods | Off |
| After 5 periods | Off |
| After 6 periods | Off |
| After 7 periods | On |
| After 8 periods | On |
| After 9 periods | On |

Note that the above pattern is present in the haptic output levels 610 as shown in periods $t_1$ through the end of period $t_{10}$. Therefore, when executing the haptic pattern, the service and driver layers power graphs 620 and 630 consume power in initiating the pattern and at the end of the pattern, at the end of period $t_{10}$. After the end of the pattern the system reverts to the power saving mode as described in FIG. 5, drawing power at each period unless the processor determines if a zero-force interval is of sufficient duration to enter an energy savings mode.

Thus, service and driver layers would send the pattern to the IF/actuator systems layer 330 at or before the start of the pattern. IF/actuator systems layer 330 layer would be responsible for playing the pattern while the service and driver layers 310 and 320 are in energy savings mode. As shown in FIG. 6, there is a power spike at $t_1$ at the start of the pattern and then the system enters the energy savings mode until the end of period $t_{10}$. In this example processor 112 determines that the zero-force interval between $t_{11}$ and $t_{12}$ is insufficient to enter an energy savings mode and thus service and driver layers continue to draw power every 5 ms until $t_{14}$. At $t_{14}$, processor 112 determines that the zero-force interval between $t_{14}$ and $t_{16}$ is of sufficient duration to enter energy savings mode.

Figure 7:
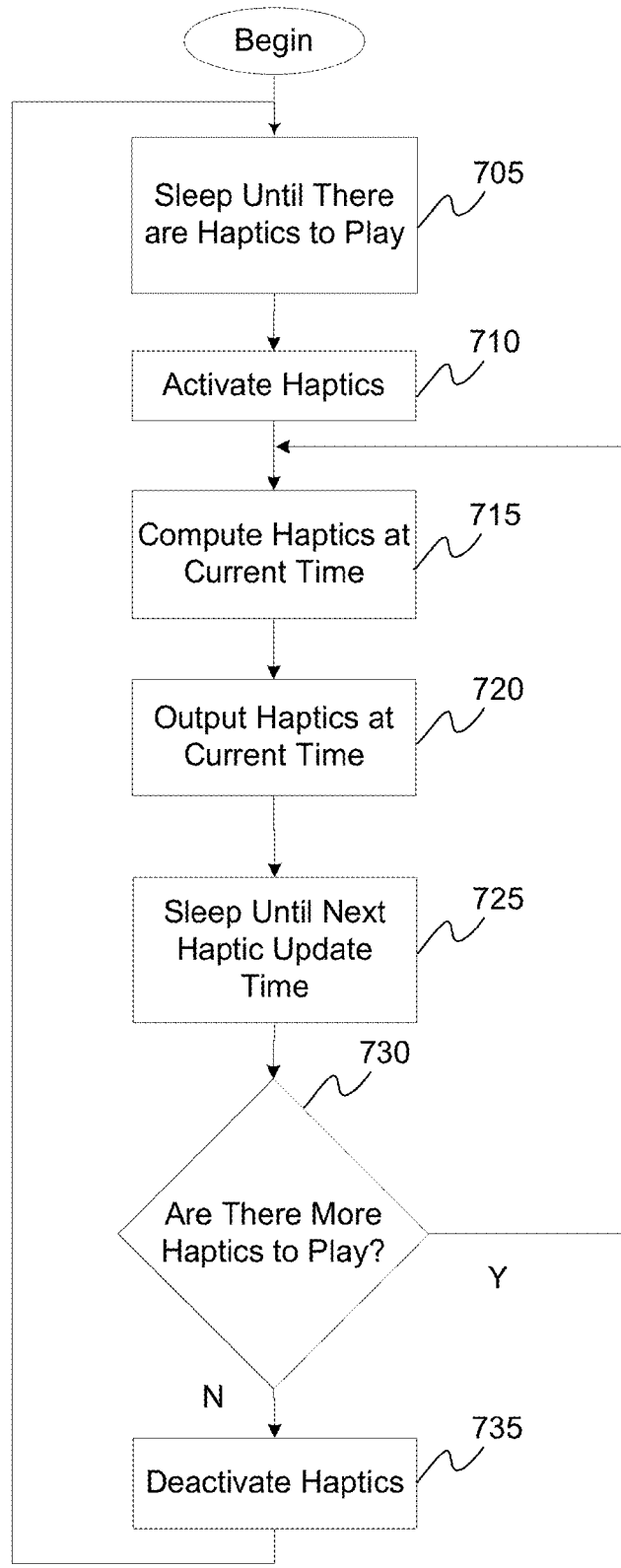
FIG. 7 illustrates a method of a haptic rendering thread algorithm with energy savings, according to an embodiment.

FIG. 7 is a flow diagram illustrating functionality 700 without energy savings for zero-force or silent haptics, according to an embodiment. In some instances, the functionality of the flow diagram of FIG. 7 (and FIG. 8 below) may be implemented by software stored in memory or other computer readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Functionality 700 starts at 705 with the haptically-enabled system in a sleep mode. In the sleep mode the system disables the haptic systems, such as a haptics amplifier shown as actuator system 150 in FIG. 1, and puts the haptics rendering thread to sleep. At 710, processor 120 receives a signal such as an interrupt that haptic resources should be activated. When an interrupt is received the system exits the sleep mode and awakens processor 120 and its associated resources. At 715 the system must calculate the current time, based on timer 136, or another low level timer circuit or function that has not been placed in the sleep mode. In other words, the system must synchronize itself with a haptic track so that the correct haptics for the current time can be generated. At 715, once the current time is computed the system determines the desired haptics to generate at the current time. At 720, once the correct haptic effects have been identified, processor 120 generates the appropriate haptic commands and sends those commands to actuator system 150 that controls actuators 152.

At 725, once processor 120 has output the haptics command to actuator system 150, the system reenters the sleep mode, as illustrated in FIG. 4 by driver layer power graph 430. The system stays in the sleep mode until timer 136 produces an interrupt. Then, at 730, when the interrupt is received the system determines if there are more haptic effects to be produced. If there are, then at 715, processor 120 re-synchronizes itself and computes the appropriate haptics at the current time and proceeds to 720. If there are no more haptic effects to be generated, then at 735 the haptic systems are deactivated and the system enters the sleep until there are more haptic effects to be generated.

Figure 8:
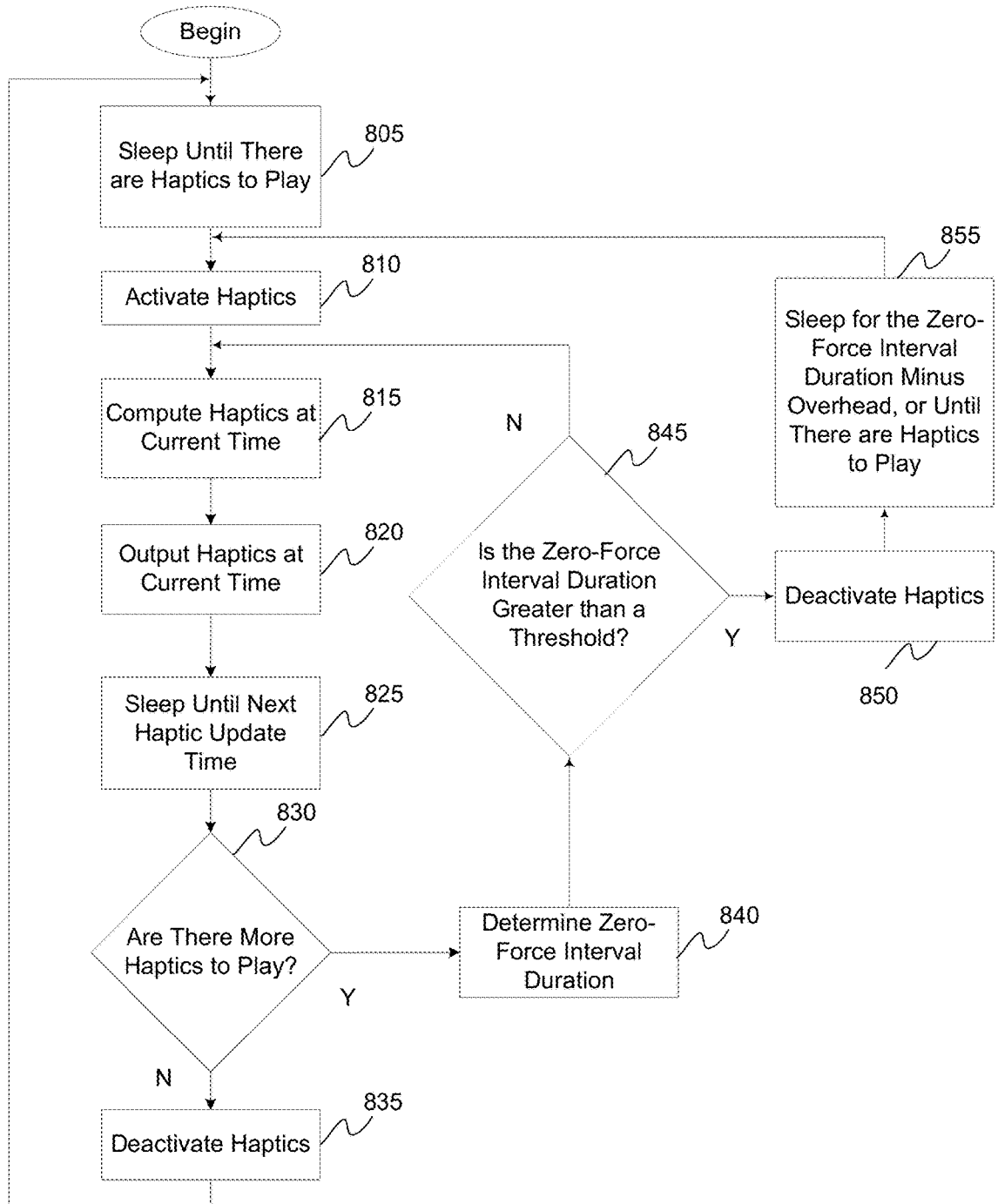
FIG. 8 illustrates a method of a haptic rendering thread algorithm with a low-power energy savings mode, according to an embodiment.

FIG. 8 is a flow diagram illustrating functionality 800 for a low-power energy savings for zero-force or silent haptics, according to an embodiment. Functionality 800 is similar to functionality 700, but includes additional steps to determine the duration of a zero-force interval, which dramatically decreases energy usage. Functionality 800 starts at 805 with the haptically-enabled system in a sleep mode. In the sleep mode the system disables the haptic systems, such as a haptics amplifier and puts the haptics rendering thread to sleep. At 810, processor 120 receives a signal such as an interrupt that haptic resources should be activated. When an interrupt is received the system exits the sleep mode and awakens processor 120 and its associated resources. At 815 the system must calculate the current time, based on timer 136 or another low level timer circuit or function that has not been placed in the sleep mode. In other words, the system must synchronize itself with a haptic track so that the correct haptics for the current time can be generated. At 815, once the current time is computed the system determines the desired haptics to generate at the current time. At 820, once the correct haptic effects have been identified, processor 120 generates the appropriate haptic commands and sends those commands to actuator system 150 that controls actuators 152.

At 825, once processor 120 has output the haptics command to actuator system 150, the system reenters the sleep mode, as illustrated in FIG. 4 by the driver layer power graph 430. The system stays in the sleep mode until timer 136 produces an interrupt. As discussed in FIG. 4 with the example that timer 136 generates an interrupt every 5 ms, there are minimal energy savings at the driver layer. As reflected in functionality 800, which follows the energy savings shown in FIGS. 5A, 5B and 6, when there are more haptics to be generated, as in 830, then at 840 the system determines the zero-force interval duration. As previously discussed, a zero-force interval is also known as a silent haptic where no actual haptic effects are being generated. Once the duration of the zero-force interval is determined, at 845 the system compares that duration to a threshold. As discussed in FIG. 5C, it is determined that the zero-force interval was not greater than the threshold value and as such the energy savings mode was not put into effect for the period between $t_1$ and $t_4$.

In functionality 800 the same logic applies, namely if the zero-force interval duration is not greater than a pre-determined threshold (i.e., if "no" at 145), then the process continues at 815 where the haptics for the current time are computed. However, if the zero-force interval duration is greater than the pre-determined threshold (i.e., if "yes" at 145), then at 850 the haptic systems are deactivated and at 855 the haptic systems enter the energy savings sleep more for the duration of the zero-force interval, less the overhead time the system needs to exit the energy savings mode and have the haptic resources restored. In addition, if the system receives an interrupt or request to produce haptic effects prior to the end of the zero-force interval duration, then the system exits the energy savings mode prematurely, activates the haptic resources at 810, re-synchronizes itself at 815 and continues the process.

As disclosed above, a haptically-enabled device includes a processor that executes a haptic track containing haptic instructions. The haptic track is analyzed to determine the presence of a zero-force interval, also known as silent haptics. The duration of the zero-force interval is determined, and if the duration exceeds a pre-determined threshold, then the system or method enters an energy savings mode. An overhead time associated with the terminating of the energy savings mode is also determined. And, the energy savings mode is terminated at the conclusion of the zero-force interval less the overhead time.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method of generating haptic effects, the method comprising:
executing, by a processor, a haptic track for a haptically-enabled device configured to generate a haptic effect;
determining a presence of a first zero-force interval and a second zero-force interval within the haptic track;
determining a first duration of the first zero-force interval and a second duration of the second zero-force interval;
determining if the first duration of the first zero-force interval and the second duration of the second zero-force interval exceeds a pre-determined threshold;
entering, based on the determination that the first duration of the first zero-force interval exceeds the pre-determined threshold, at a start of the first zero-force interval, a first energy savings mode, wherein entering the energy savings mode comprises shutting down a haptic interface logic system that controls an actuator system of the haptically-enabled device including a haptic actuator configured to generate the haptic effect;
terminating the first energy savings mode at a conclusion of the first zero force interval when no haptics call is received during the first duration of the first zero-force interval;
entering, based on the determination that the second duration of the second zero-force interval exceeds the pre-determined threshold, at a start of the second zero-force interval, a second energy savings mode,
terminating the second energy savings mode before the conclusion of the second zero force interval upon receipt of a haptics call; determining a duration of the second energy savings mode upon the premature termination of the second energy savings mode; and
synchronizing the haptic track with a time of the premature termination of the second energy savings mode based on the duration of the second energy savings mode.

2. The method of claim 1, further comprising:
determining an overhead time associated with termination of the first energy savings mode; and
terminating the first energy savings mode at a conclusion of the first zero-force interval less the overhead time.

3. The method of claim 1, further comprising, based on the duration of the first energy savings mode, synchronizing the haptic track with a time of termination of the first energy savings mode.

4. The method of claim 1, wherein entering the first energy savings mode or the second energy savings mode further comprises suspending execution of the haptic track.

5. The method of claim 1, further comprising analyzing the haptic track for a future occurrence of a third zero-force interval.

6. The method of claim 5, further comprising generating a haptic pattern that comprises the future occurrence of the third zero-force interval and a non-silent haptic instruction, wherein execution of the haptic pattern occurs during a third energy savings mode.

7. The method of claim 6, wherein the haptic pattern comprises a pre-determined number of time intervals.

8. An energy savings haptic effects system comprising:
a haptically-enabled device configured to generate a haptic effect;
a timer; and
a processor configured to:
execute a haptic track comprising haptic instructions;
identify a first zero-force interval and a second zero-force interval within the haptic track;
determine a first duration of the first zero-force interval and a second duration of the second zero-force interval; and
determine if the first duration of the first zero-force interval and the second duration of the second zero-force interval exceeds a pre-determined threshold;
a power controller configured to:
enter a first energy savings mode at a start of the first zero-force interval if based on the determination that the first duration of the first zero-force interval exceeds the pre-determined threshold, wherein entering the energy savings mode comprises shutting down a haptic interface logic system that controls an actuator system of the haptically-enabled device including a haptic actuator configured to generate the haptic effect,
terminate the first energy savings mode at a conclusion of the first zero force interval when no haptics call is received during the first duration of the first zero-force interval;
enter, based on the determination that the second duration of the second zero-force interval exceeds the pre-determined threshold, at a start of the second zero-force interval, a second energy savings mode,
terminate the second energy savings mode before the conclusion of the second zero force interval upon receipt of a haptics call,
determine a duration of the second energy savings mode upon the premature termination of the second energy savings mode, and
synchronize the haptic track with a time of the premature termination of the second energy savings mode based on the duration of the second energy savings mode.

9. The system of claim 8, wherein the processor is further configured to determine an overhead time associated with a termination of the first energy savings mode and to terminate, using the timer, the first energy savings mode at a conclusion of the first zero-force interval less the overhead time.

10. The system of claim 8, wherein the processor is further configured to analyze the haptic track for a future occurrence of a third zero-force interval.

11. The system of claim 10, wherein the processor is further configured to generate a haptic pattern that comprises the future occurrence of the third zero-force interval and a non-silent haptic instruction, wherein execution of the haptic pattern occurs during a third energy savings mode.

12. A non-transitory computer-readable medium having instructions stored thereon that, when executed by a processor, cause the processor to enter an energy savings mode, the entry of the energy savings mode comprising:
executing, by a processor, a haptic track for a haptically-enabled device configured to generate a haptic effect;
determining a presence of a first zero-force interval and a second zero-force interval within the haptic track;
determining a first duration of the first zero-force interval and a second duration of the second zero-force interval;

determining if the first duration of the first zero-force interval and the second duration of the second zero-force interval exceeds a pre-determined threshold;

entering, based on the determination that the first duration of the first zero-force interval exceeds the pre-determined threshold, at a start of the first zero-force interval, a first energy savings mode, wherein entering the energy savings mode comprises shutting down a haptic interface logic system that controls an actuator system of the haptically-enabled device including a haptic actuator configured to generate the haptic effect;

terminating the first energy savings mode at a conclusion of the first zero force interval when no haptics call is received during the first duration of the first zero-force interval;

entering, based on the determination that the second duration of the second zero-force interval exceeds the pre-determined threshold, at a start of the second zero-force interval, a second energy savings mode, terminating the second energy savings mode before the conclusion of the second zero force interval upon receipt of a haptics call;

determining a duration of the second energy savings mode upon the premature termination of the second energy savings mode; and synchronizing the haptic track with a time of the premature termination of the second energy savings mode based on the duration of the second energy savings mode.

13. The non-transitory computer-readable medium of claim 12, further comprising analyzing the haptic track for a future occurrence of a third zero-force interval.

14. The method of claim 1, wherein shutting down the haptic interface logic system further comprises shutting down the actuator system and the haptic actuator.

15. The system of claim 8, wherein shutting down the haptic interface logic system further comprises shutting down the actuator system and the haptic actuator.

16. The non-transitory computer-readable medium of claim 12, wherein shutting down the haptic interface logic system further comprises shutting down the actuator system and the haptic actuator.

17. The method of claim 1, wherein during the first zero-force interval within the haptic track the haptic actuator consumes no power.

18. The system of claim 8, wherein during the first zero-force interval within the haptic track the haptic actuator consumes no power.

19. The non-transitory computer-readable medium of claim 12, wherein during the first zero-force interval within the haptic track the haptic actuator consumes no power.

* * * * *